United States Patent
Kuhn

[11] 3,742,043
[45] June 26, 1973

[54] 2-(ALPHA,ALPHA-BIS(TRIFLUOROME-THYL)BENZYLOXY) ACETIC ACID AND ESTERS THEREOF

[75] Inventor: Stephen J. Kuhn, Sarnia, Ontario, Canada

[73] Assignee: The Dow Chemical Company, Midland, Mich.

[22] Filed: Apr. 24, 1972

[21] Appl. No.: 246,783

[52] U.S. Cl............ 260/521 A, 260/473 A, 71/109, 71/116
[51] Int. Cl........................ C07c 65/00, C07c 69/76
[58] Field of Search.................... 260/521 A, 521 R, 260/473 A

[56] References Cited
OTHER PUBLICATIONS

Julia et al. C. A. 76109m (1971) Vol. 75

Boije, C. A. 52 5725d (1958)

*Primary Examiner*—Lorraine A. Weinberger
*Assistant Examiner*—John F. Terapane
*Attorney*—William M. Yates, L. Wayne White et al.

[57] ABSTRACT

New compounds are disclosed which correspond to the formula

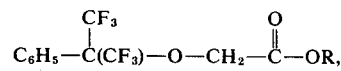

wherein R is hydrogen or lower alkyl. They are prepared by reacting (a) esters of chloroacetic acid or bromoacetic acid with (b) $\alpha,\alpha$-bis(trifluoromethyl)-benzyl alcohol in the presence of strong base. They are herbicides.

2 Claims, No Drawings

2-(ALPHA,ALPHA-BIS(TRIFLUOROMETHYL)-BENZYLOXY) ACETIC ACID AND ESTERS THEREOF

BACKGROUND OF THE INVENTION $\alpha,\alpha$-Bis(trifluoromethyl)benzyl alcohol is a known compound. Cf. B. S. Farah et al., J. Org. Chem. 30, 998 (1965) and I. L. Knunyants et al. (C.A. 57: 12305$i$). It is here used as a reactant.

SUMMARY OF THE INVENTION

I have discovered a novel class of compounds which correspond to the formula $$C_6H_5-\underset{\underset{CF_3}{|}}{\overset{\overset{CF_3}{|}}{C}}-O-CH_2-\overset{\overset{O}{\|}}{C}-O-R, \quad (I)$$

wherein R is hydrogen or lower alkyl of from one to four carbon atoms. The compounds are biologically active and are useful as herbicides.

The novel esters are conveniently prepared by reacting (a) esters of chloroacetic acid or bromoacetic acid $$(ClCH_2\overset{\overset{O}{\|}}{C}-OR \quad \text{or} \quad BrCH_2\overset{\overset{O}{\|}}{C}-OR)$$

with (b) $\alpha,\alpha$-bis(trifluoromethyl)benzyl alcohol. The process is generally conducted in the presence of a strong base and in a liquid reaction medium (e.g., benzene, toluene and the like).

When R is hydrogen in Formula I, the compound is an acid. This acid is prepared by a conventional hydrolysis of any of the above esters.

Examples of suitable such esters of chloroacetic acid and bromoacetic acid include the methyl, ethyl, n-propyl, isopropyl and butyl esters thereof. Other esters can likewise be used.

EXAMPLES

The following examples further illustrate the invention.

Example 1 — Preparation of Ethyl $\alpha,\alpha$-Bis(trifluoromethyl)benzyloxy-acetate acetate $\alpha,\alpha$-Bis(trifluoromethyl)benzyl alcohol (0.2 mole) dissolved in 100 ml. of toluene and 17.5 g. of 50 percent aqueous caustic were charged to a reaction vessel equipped with a stirring means, heating means, and a condenser. White crystals formed immediately. The reaction mixture was warmed to reflux conditions and the water removed as an azeotrope with toluene. After the water was removed, 100 ml. of toluene and ethyl bromoacetate (0.2 mole) were charged to the vessel and the reaction mixture warmed at reflux temperature for 2 hours. The mixture was cooled, neutralized with aqueous HCl, washed twice with 100 ml. portions of water, dried over calcium sulfate and the organic phase recovered. The desired product was distilled from the organic phase under reduced pressure. The product was obtained in 86 percent yield, based on theory. Boiling point 108°–110°C. at 0.5 mm. of Hg. pressure. Refractive index $n_D$ at 22.5°C. = 1.4273.

Calc. for $C_{13}H_{12}F_6O_3$: C 47.3; H 3.66
Found: C 47.0; H 3.81

The product structure was also confirmed by infrared and nuclear magnetic resonance spectra.

Example 2

The ester (0.1 mole) from Example 1 was heated at 60°C. in 100 ml. of 10 percent aqueous NaOH for 3–4 hours. The homogeneous solution thus formed was cooled, neutralized with concentrated HCl, and the product extracted therefrom with methylene chloride. The crude product was then recovered by removing the methylene chloride under reduced pressure. Subsequent recrystallization of the crude product from a hexane solution rendered the desired product as a white crystalline solid melting at 105°–107°C. Yield 95.2 percent of theory. The product structure was confirmed by infrared, nuclear magnetic resonance and elemental analysis.

Calc. for $C_{11}H_8F_6O_3$: C 43.66; H 2.66
Found: C 43.56; H 2.7

The compounds of the present invention are suitable for use as herbicides in the control of yellow foxtail. For such uses, the unmodified substance can be utilized or they can be used in a formulation. Thus, for example, the subject compounds can be dispersed on a finely divided solid and employed therein as a dust. Also, the compounds, or a solid composition comprising the compound, can be dispersed in water (typically with the aid of a wetting agent) and the resulting aqueous suspension employed as a spray. In other procedures, the subject compound can be employed as a constituent of organic liquid compositions, oil-in-water and water-in-oil emulsions, or water dispersions, with or without the addition of wetting, dispersing or emulsifying agents.

In representative operations, each of the ethyl $\alpha,\alpha$-bis(trifluoromethyl)benzyloxy-acetate and $\alpha,\alpha$-bis(trifluoromethyl)benzyloxy-acetic acid compounds gives complete control and kill of yellow foxtail when plants of such species are sprayed to run-off with compositions containing one of the above-named compounds at a concentration of 4000 parts per million by weight.

The following compounds are prepared and used in a similar manner:

$$C_6H_5-C(CF_3)_2OH + ClCH_2-COOCH_3 \xrightarrow{KOH} C_6H_5-C(CF_3)_2-O-CH_2-COOCH_3$$

$$C_6H_5-C(CF_3)_2OH + BrCH_2-COOC_3H_7 \xrightarrow{KOH} C_6H_5-C(CF_3)_2-O-CH_2-COOC_3H_7$$

$$C_6H_5-C(CF_3)_2OH + ClCH_2-COOC_4H_9 \xrightarrow{KOH} C_6H_5-C(CF_3)_2-O-CH_2-COOC_4H_9$$

I claim:

1. A compound corresponding to the formula $$C_6H_5-\underset{\underset{CF_3}{|}}{\overset{\overset{CF_3}{|}}{C}}-O-CH_2-\overset{\overset{O}{\|}}{C}-O-R,$$

wherein R is hydrogen or alkyl of from one to four carbon atoms.

2. The compound defined in claim 1 wherein R is hydrogen.

* * * * *